United States Patent
Buttgenbach (10) Patent No.: US 11,569,662 B1
(45) Date of Patent: *Jan. 31, 2023

(54) CONSISTENT POWER DELIVERY VIA STRETCH POWER DELIVERY MODE

(71) Applicant: 8me Nova, LLC, El Dorado Hills, CA (US)

(72) Inventor: Thomas Buttgenbach, Santa Monica, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,920

(22) Filed: Aug. 31, 2022

Related U.S. Application Data (63) Continuation of application No. 17/589,596, filed on Jan. 31, 2022, now Pat. No. 11,451,060.

(51) Int. Cl.
 *H02J 3/38* (2006.01)
 *H02J 3/00* (2006.01)
 *G05B 19/042* (2006.01)

(52) U.S. Cl.
 CPC ............. *H02J 3/38* (2013.01); *G05B 19/042* (2013.01); *H02J 3/003* (2020.01); *H02J 3/004* (2020.01); *G05B 2219/2639* (2013.01); *H02J 2300/20* (2020.01)

(58) Field of Classification Search
 CPC .... H02J 3/38; H02J 3/003; H02J 3/004; H02J 2300/20; G05B 19/042; G05B 2219/2639
 USPC ....................................... 700/295
 See application file for complete search history.

(56) References Cited

U.S. PATENT DOCUMENTS

| | | |
|---|---|---|
| 2012/0041795 A1 | 2/2012 | Cabrini |
| 2015/0153756 A1* | 6/2015 | Marcus ............... G06Q 40/04 700/286 |
| 2017/0082992 A1 | 3/2017 | Riley et al. |
| 2018/0262005 A1* | 9/2018 | Lazaris ............... G06Q 50/06 |
| 2019/0027936 A1 | 1/2019 | Kim et al. |
| 2021/0234375 A1 | 7/2021 | Hatta et al. |

OTHER PUBLICATIONS

Planning and Operating Combined Wind-Storage System in Electricity Market (IEEE Transactions on Sustainable Energy, vol. 3, No. 2, Apr. 2012), Maria Dicorato, (2012).

* cited by examiner

*Primary Examiner* — Jigneshkumar C Patel
(74) *Attorney, Agent, or Firm* — Foley & Lardner LLP (57) ABSTRACT

A method for delivering power to a grid. The method may include receiving a prediction of power generation for a renewable energy source (RES), receiving length of power delivery requirements of the grid, determining a stretch mode limit based on the prediction of power generation and the length of power delivery requirements such that a period of time during which the RES and an ESS can deliver power to the grid is extended to satisfy the length of power delivery requirements, wherein the stretch mode limit comprises a limit on power delivered to the grid, and delivering power to the grid according to the stretch mode limit from the RES and an energy storage system (ESS) electrically coupled to the RES, wherein the combined output of the RES and the ESS is limited by the stretch mode limit.

21 Claims, 10 Drawing Sheets

CONSISTENT POWER DELIVERY VIA STRETCH POWER DELIVERY MODE

CROSS-REFERENCE TO RELATED PATENT APPLICATIONS

This application is a continuation of U.S. patent application Ser. No. 17/589,596, filed Jan. 31, 2022, which application is incorporated herein by reference in its entirety.

BACKGROUND

Renewable energy sources may produce power at levels different than power grid requirements. This may result in lack of power if less power is produced than is needed at the grid or in waste of power if more power is produced than is needed at the grid. Power demand and power production may vary seasonally. Different power needs on the power grid may exist in different seasons and power produced by a renewable energy source may vary throughout the year. This variation may result in uncertainty as to how well a renewable energy source can meet the needs of a power grid throughout the year.

SUMMARY

Aspects of one embodiment of the present disclosure relate to a method for controlling the power output of a power plant. The method may include receiving a prediction of power generation for a renewable energy source (RES), receiving power level requirements of a grid, and receiving length of power delivery requirements of the grid. The method may also include assigning weights to the power level requirements of the grid and the length of power delivery requirements of the grid, determining a power delivery limit based on the prediction of power generation, the weighted power level requirements, and the weighted length of power delivery requirements, and delivering power to the grid according to the power delivery limit from the RES and an energy storage system (ESS) electrically coupled to the RES.

The method may include wherein the power level requirements of the grid are lower than the prediction of power generation for the RES.

The method may include wherein delivering power to the grid according to the power delivery limit includes directing power to the ESS.

The method may include wherein power generated by the RES in excess of the power delivery limit is directed to the ESS.

The method may include wherein the length of power delivery requirements of the grid specify an amount of time greater than a length of time of power generation of the RES.

The method may include wherein determining the power delivery limit includes determining an amount of power which can be delivered for the amount of time specified in the length of power delivery requirements.

The method may include wherein delivering power to the grid according to the power delivery limit includes directing power to the ESS while the RES is generating power and directing power from the ESS to the grid when the RES is not generating power.

Aspects of one embodiment of the present disclosure relate to a system comprising one or more processors configured to receive a prediction of power generation for a renewable energy source (RES), receive power level requirements of a grid, and receive length of power delivery requirements of the grid. The one or more processors may be further configured to determine a power delivery limit based on the prediction of power generation, the power level requirements, and the length of power delivery requirements, and deliver power to the grid according to the power delivery limit from the RES and an energy storage system (ESS) electrically coupled to the RES.

The system may include wherein the power level requirements of the grid are lower than the prediction of power generation for the RES.

The system may include wherein delivering power to the grid according to the power delivery limit includes directing power to the ESS.

The system may include wherein delivering power to the grid according to the power delivery limit includes directing power to the ESS while the RES is generating power and directing power from the ESS to the grid when the RES is not generating power.

The system may include wherein the length of power delivery requirements of the grid specify an amount of time greater than a length of time of power generation of the prediction of power generation for the RES.

The system may include wherein determining the power delivery limit comprises determining an amount of power which can be delivered for the amount of time specified in the length of power delivery requirements.

The system may include wherein delivering power to the grid according to the power delivery limit includes directing power to the ESS while the RES is generating power and directing power from the ESS to the grid when the RES is not generating power.

Aspects of one embodiment of the present disclosure relate to a non-transitory computer-readable storage medium having instructions stored thereon that, upon execution by a processor, cause the processor to perform operations including receiving a prediction of power generation for a renewable energy source (RES), receiving power level requirements of a grid, and receiving length of power delivery requirements of the grid. The operations may further include determining a power delivery limit based on the prediction of power generation, the power level requirements, and the length of power delivery requirements, and delivering power to the grid according to the power delivery limit from the RES and an energy storage system (ESS) electrically coupled to the RES.

The non-transitory computer-readable storage medium may include wherein the power level requirements of the grid are lower than the prediction of power generation for the RES.

The non-transitory computer-readable storage medium may include wherein delivering power to the grid according to the power delivery limit includes directing power to the ESS.

The non-transitory computer-readable storage medium may include wherein power generated by the RES in excess of the power delivery limit is directed to the ESS.

The non-transitory computer-readable storage medium may include wherein the length of power delivery requirements of the grid specify an amount of time greater than a length of time of power generation of the RES.

The non-transitory computer-readable storage medium may include wherein delivering power to the grid according to the power delivery limit includes directing power to the ESS while the RES is generating power and directing power from the ESS to the grid when the RES is not generating power.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present disclosure allow for a power plant utilizing a renewable energy source (RES) and an energy storage system (ESS) to deliver consistent, predictable power. The power delivered can be determined based on predicted RES power generation, power grid power level requirements, and power grid length of power delivery requirements. The power plant may place an artificial cap on the amount of power it delivers to the grid. The artificial cap may be an amount of power which the power plant can deliver despite natural fluctuations in power generation of the RES. The artificial cap may be an amount of power the grid is able to accept. Placing the artificial cap on the amount of power the power plant delivers to the grid allows the power plant to provide a consistent amount of power in line with the needs of the power plant and to provide power for a greater amount of time than it could without the artificial cap. This system has the advantage of providing more consistent power to power grids compared to power plants without artificial caps on power delivery. This system also allows power plant operators and grid operators to plan and agree on specific levels of power well in advance. This removes a level of uncertainty from projections of power generation which is highly beneficial for grid operators. This system may allow a power plant utilizing an RES to deliver baseload power to the grid, or power at a consistent level day and night.

Figure 1:
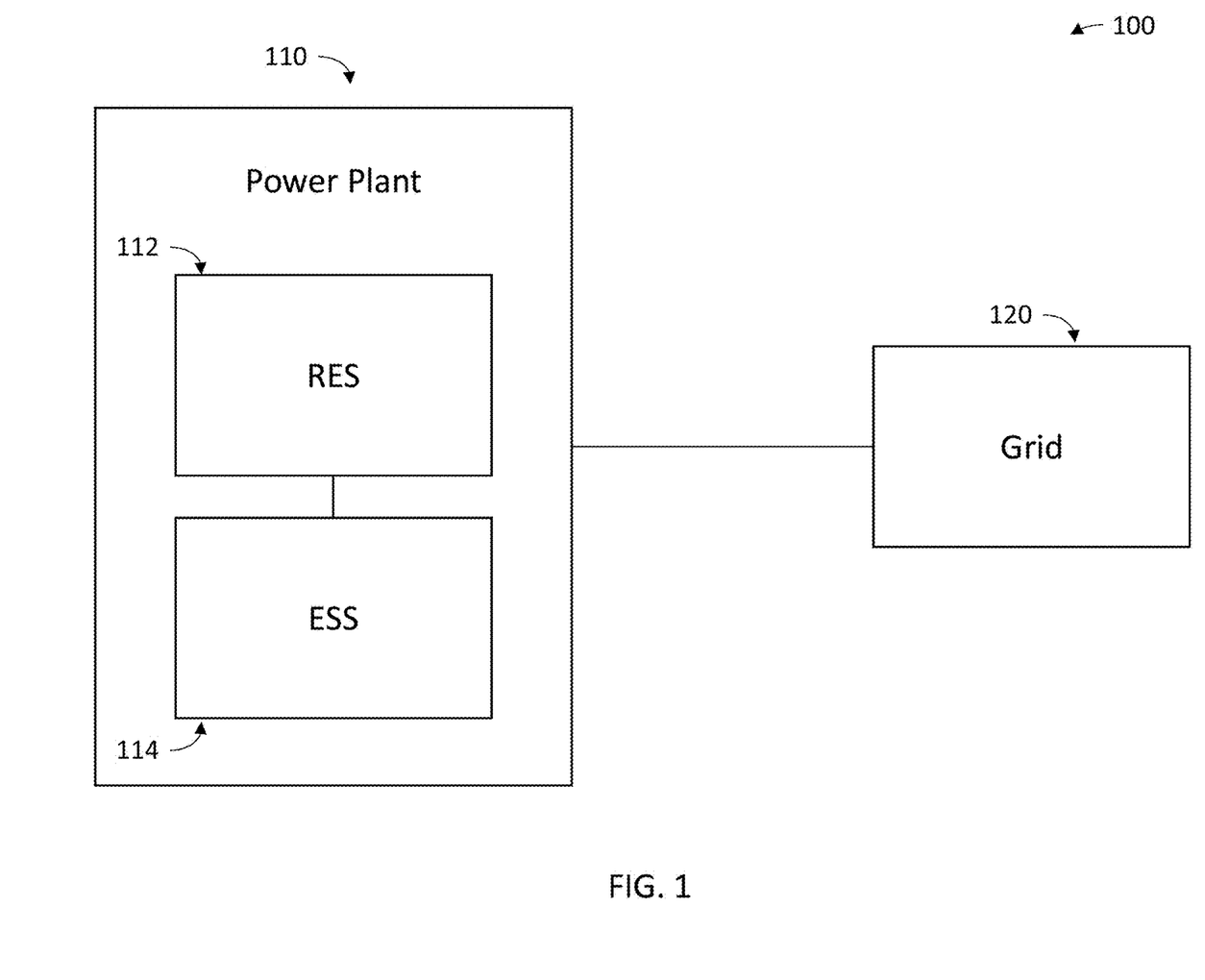
FIG. 1 illustrates an example environment in accordance with one or more embodiments.

FIG. 1 illustrates an example environment 100 in accordance with one or more embodiments. The environment 100 may include a power plant 110 and a grid 120. The power plant 110 may include a renewable energy source (RES) 112 and an energy storage system (ESS) 114. The RES 112 may be a photovoltaic (PV) array, a wind farm, a geothermal unit, or other renewable energy resource. The ESS 114 may be a rechargeable battery, a pumped hydroelectric system, a flow battery, a capacitive battery, a flywheel, a compressed air system, a liquefied air system, a hydrogen system, or a gravity system. The RES 112 and ESS 114 may be operably coupled to each other. The RES 112 may direct power to the grid 120 and/or to the ESS 114. For example, the RES 112 may direct a first portion of power generated to the grid 120 and a second portion of power generated to the ESS 114. The ESS may direct power to the grid 120. For example, the ESS may direct power to the grid 120 when the power generated by the RES falls below a certain value. The grid 120 may be an electrical grid. The power plant 110 may connect to the grid 120 at a point of grid interconnect (POGI). The power plant 110 may be limited in how much power it can send to the grid 120 by a POGI limit. The POGI limit may be determined by an operator of the grid 120. The RES 112 may have a power generation capacity which exceeds the POGI limit. The RES 112 may direct power in excess of the POGI limit to the ESS. The ESS 114 may receive power from the RES 112 and/or from the grid 120.

Figure 2:
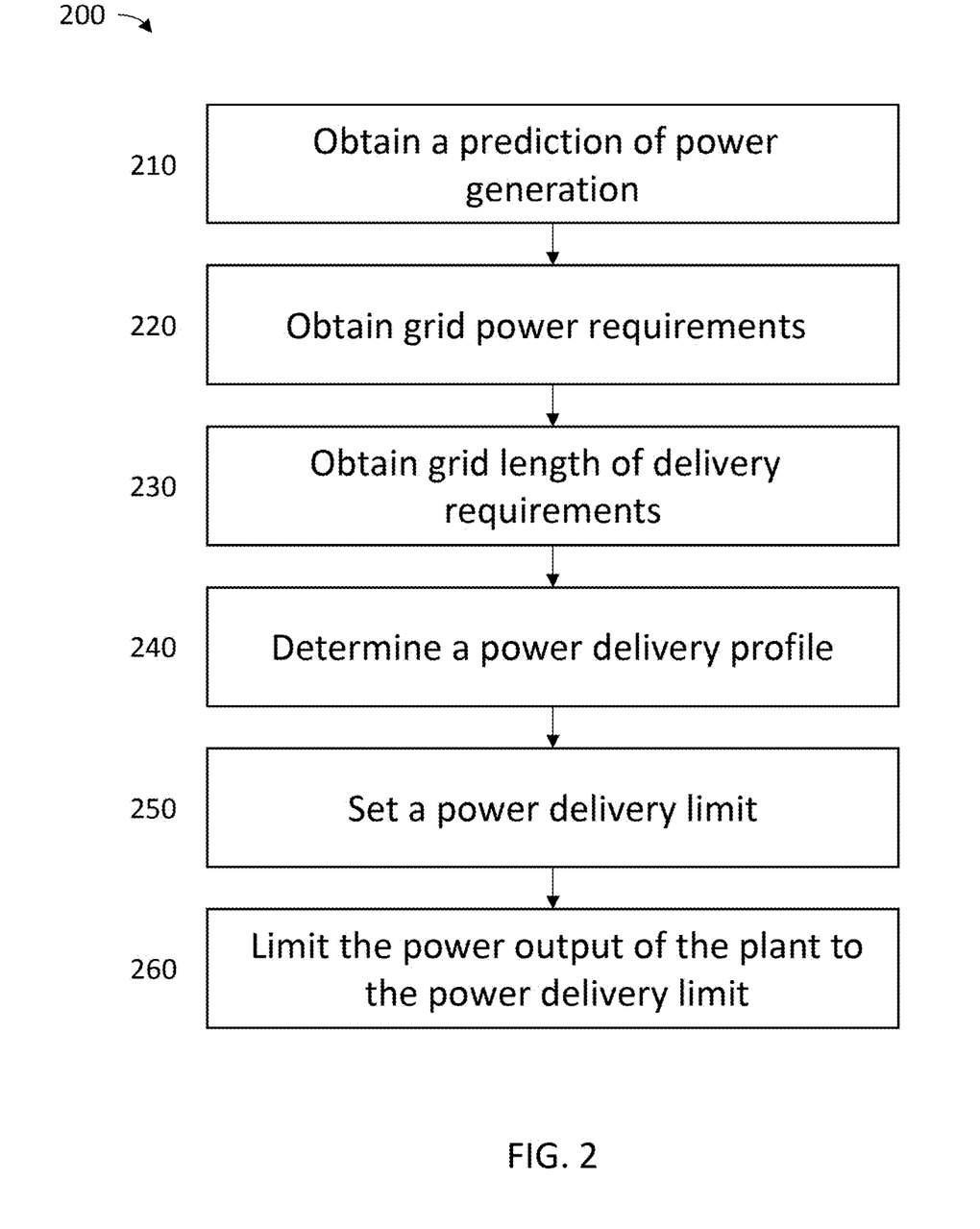
FIG. 2 is a flow diagram depicting operations in a process for delivering power to a grid using a power delivery limit in accordance with one or more embodiments.

FIG. 2 is a flow diagram 200 depicting operations in a process for delivering power to a grid according to a stretch mode limit in accordance with one or more embodiments. Additional, fewer, or different operations may be performed in the method, depending on the embodiment. Further, the operations may be performed in the order shown, concurrently, or in a different order. At 210, a prediction of power generation is obtained. The prediction of power generation may be based on historical data, weather forecasts, maintenance schedules, or other factors. For example, a prediction of power generation for a PV array may be generated based on an expected irradiance of the PV array. The expected irradiance may be calculated using historical irradiance data and a weather forecast. The prediction of power generation may be a prediction of power generated during a period of time ranging in length from one minute to one year. The prediction of power generation may be a prediction of power generated every minute for a period of time ranging in length from 5 minutes to a year. The prediction of power generation may be updated continuously or at regular intervals. For example, the prediction of power generation may be updated every hour as updated weather forecasts are obtained.

At 220, grid power requirements are obtained. The grid power requirements may also be termed "power level requirements of a grid." The grid power requirements may include levels of power which are required at different times. The grid power requirements may be the power required from the power plant. The grid power requirements may be power level requirements for different times in a day, a week, a month, a year, or any other period of time. The grid power requirements may specify how much power is needed each minute, hour, day, or any other interval of time. The grid power requirements may vary daily, weekly, monthly, and/or annually. For example, the grid power requirements may be greater each day during hours when many people are awake and less when many people are sleeping. As another example, the grid power requirements may be greater in the summer when electrical power is used to run air conditioners and less in the winter when air conditioners are not used.

At 230, grid length of delivery requirements are obtained. The grid length of delivery requirements may also be termed "length of power delivery requirements of a grid." The grid length of power requirements may include periods of time when power is needed. The grid length of power requirements may be combined with the grid power requirements to define periods of time when a certain amount of power is needed. The grid length of delivery requirements may vary daily, weekly, monthly, and/or annually. For example, the grid length of delivery requirements may be greater on weekends when many people stay up late and less on weekdays when fewer people stay up late. As another example, grid length of delivery requirements may be greater in the winter when the days are shorter and less in the summer when the days are longer.

At 240, a power delivery profile is determined. The power delivery profile may be determined by combining the grid power requirements and the grid length of delivery requirements. Different aspects of the grid power requirements and the grid length of delivery requirements may be weighted to denote their relative importance. For example, in hot summer months, the grid power requirements may be very high in the middle of the day and the full power generation capacity of the RES is required. The grid length of delivery requirements may be unable to be met by the RES if all of the power generated by the RES is sent to the grid and none is sent to the ESS. However, it may be more important to deliver power in the middle of the day than in the evening, meaning that the grid power requirements have a greater weight than the grid length of delivery requirements. In this example, a power delivery profile would be generated that specifies a high level of power delivery for a short amount of time. In another example, in winter months, the full power generation capacity of the RES may be greater than the grid can accept. A limit on how much power the grid can accept is given great weight. The grid length of delivery requirements may specify that power is needed until late in the evening. In this example, a power delivery profile would be generated that specifies a level of power delivery below the grid acceptance level for a long amount of time.

At 250, a power delivery limit is set. The power delivery limit may be set in accordance with the power delivery profile. The power delivery limit may be calculated based on the weighted grid power requirements and the weighted grid length of delivery requirements. In some embodiments the power delivery limit may be set by also taking into account the cost of transmitting excess power to a second grid. The power delivery limit may be set so as to satisfy the weighted grid power requirements and the weighted grid length of delivery requirements. For example, in winter, the grid power level requirements and the grid length of power requirements may result in a power delivery profile that specifies delivery of a constant level of power well below the POGI limit. In this example, the power delivery limit is set so as to ensure that the ESS is fully charged by the RES in the day and has enough charge and discharges slowly enough to deliver power all night long. A safety factor may be applied to account for variability in the power generation of the RES. The power delivery limit may vary every minute, hour, day, month, year, or other interval of time. The power delivery limit may be updated every minute, hour, day, month, year, or other interval of time. The power delivery limit may be updated based on an updated prediction of power generation, updated grid power requirements, and/or grid length of delivery requirements. The power delivery limit may be set in advance for a day, a week, a month, a year, or any other period of time. For example, the power delivery limit may be set in advance for a year, with the power delivery limit varying each week. The power delivery limit may be lower in the winter months and higher in the summer months. The advantage of setting the power delivery limit in advance is that it provides consistency and predictability to the grid operator.

At 260, the power output of the power plant is limited to the power delivery limit. Power from the RES may be allocated between the grid and the ESS according to the power delivery limit. For example, if the power delivery limit is less than the full power generating capacity of the RES, power may be directed from the RES to the ESS such that the RES only delivers power up to the power delivery limit to the grid. If the ESS is fully charged, power generated by the RES in excess of the power delivery limit must be sent elsewhere, curtailed, or dissipated. Allocating power between the ESS and the grid may be done by a control system of the power plant or by reconfiguring hardware of the power plant.

Power may be directed from the RES to the grid or the ESS. The ESS may direct power to the grid. If RES power generation is greater or equal to the power delivery limit, and the ESS is not fully charged, power may be directed to the grid from the RES at the power delivery limit and power generated by the RES in excess of the power delivery limit is directed to the ESS. If RES power generation is greater or equal to the power delivery limit and the ESS is fully charged, power may be directed to the grid from the RES at the power delivery limit and power generated by the RES in excess of the power delivery limit may be curtailed, directed to the second grid, or dissipated in a resistive load or other electrical load. If RES power generation is less than the power delivery limit and there is sufficient energy in the ESS, power is directed from the RES and/or the ESS to the grid at the power delivery limit. If RES power generation is less than the power delivery limit and there is insufficient energy in the ESS to deliver power at the power delivery limit, power is directed from the RES and/or the ESS to the grid below the power delivery limit.

Figure 3:
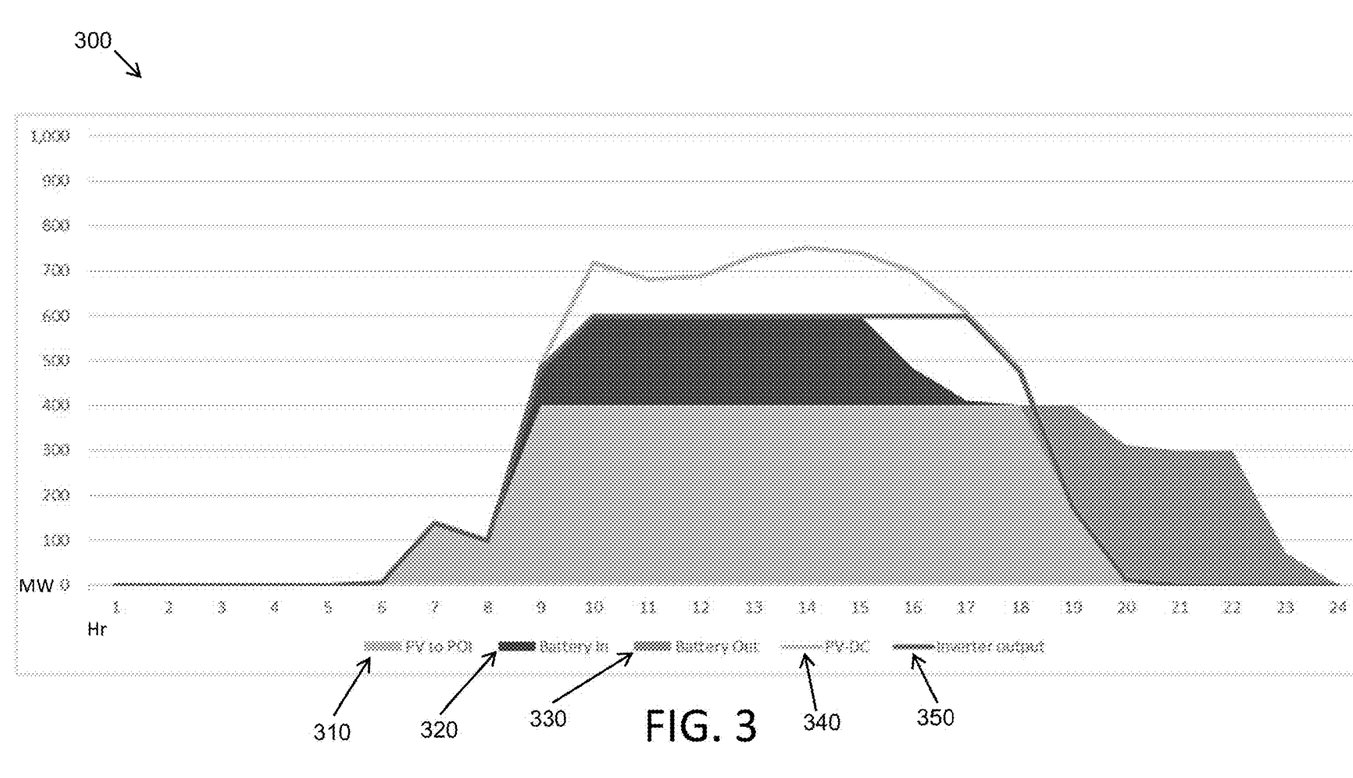
FIG. 3 illustrates an example of power generation and delivery over 24 hours in July for a power plant including an RES and an ESS, in accordance with one or more embodiments.

FIG. 3 illustrates an example 300 of power generation and delivery over 24 hours in July for a power plant including an RES and an ESS, in accordance with one or more embodiments. The example 300 does not implement a power delivery limit. The example 300 includes shading 310 representing energy sent from the RES to the grid or point of interconnect (POI) with the grid. The example 300 includes shading 320 representing energy sent to the ESS from the RES. The example 300 includes shading 330 representing energy sent from the ESS to the grid or the POI with the grid. The example 300 includes a first line 340 representing an amount of DC power the RES is capable of producing at each hour of the day. The example 300 includes a second line 350 representing the amount of AC power produced by an inverter system of the RES, or the inverter output. In the example 300, the RES is rated at 800 MW and the inverter capacity is rated at 600 MW, while a limit to how much power the grid can receive, otherwise called a point of grid interconnect (POGI) limit, is 400 MW. In the example 300, the ESS has a capacity of 1,200 MWh and a power limit of 300 MW.

In the example 300, the inverter output 350 rises to 600 MW by hour 10, but only 400 MW is delivered to the POGI according to the POGI limit. 200 MW is diverted from the RES to the ESS as shown by the shading 320, charging the ESS. At hour 18, when the inverter output 350 declines, the ESS begins delivering power to the grid, as shown by shading 330. For the time period roughly corresponding to the time between hours 20 and 22, the RES is not generating power and the only power supplied to the grid comes from the ESS. This power is delivered at a level of 300 MW, the power limit of the ESS. The power delivered to the grid from the ESS declines starting around hour 22 until it reaches zero around hour 24.

Figure 4:
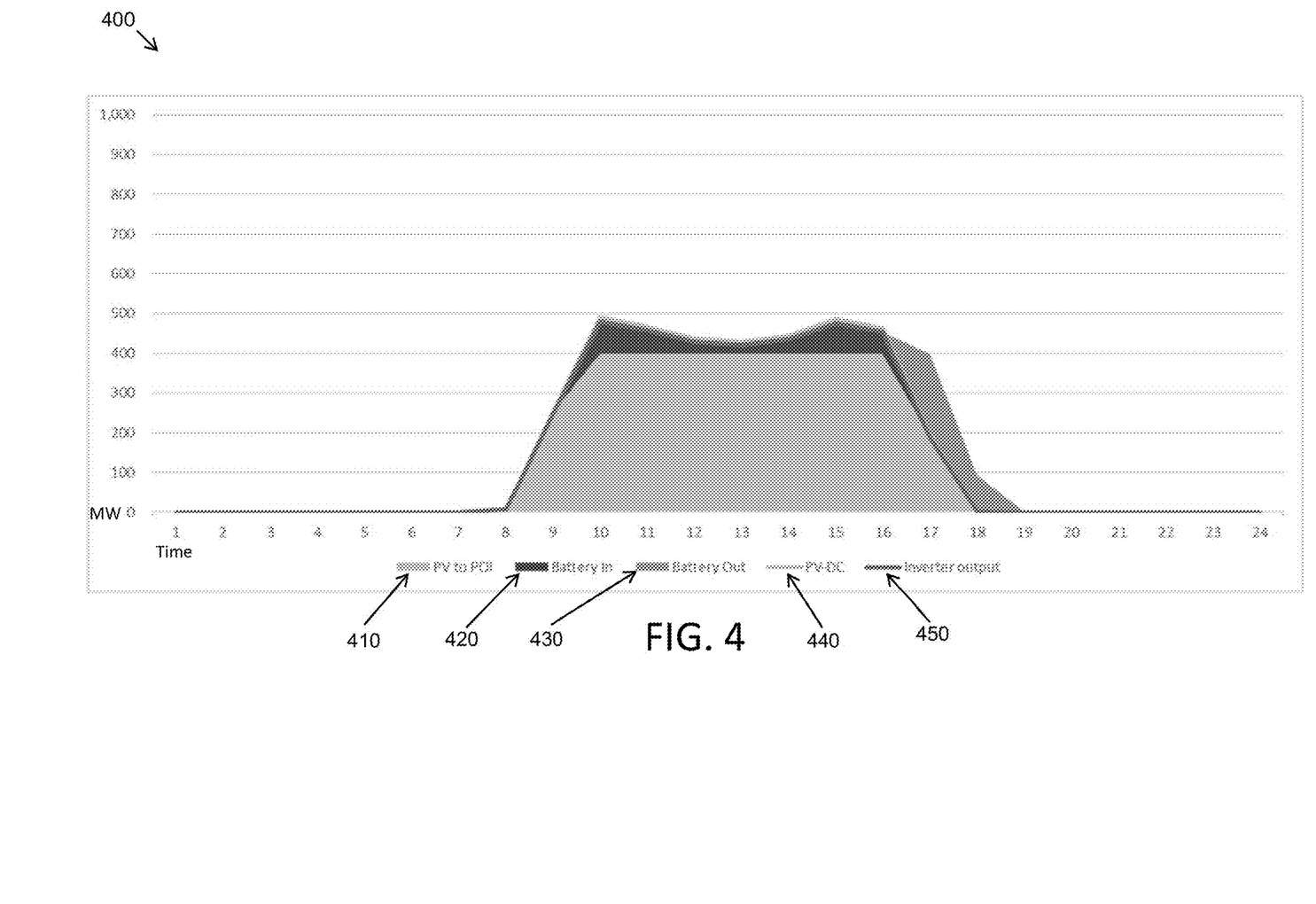
FIG. 4 illustrates an example of power generation and delivery over 24 hours in January for a power plant including an RES and an ESS, in accordance with one or more embodiments.

FIG. 4 illustrates an example 400 of power generation and delivery over 24 hours in January for a power plant including an RES and an ESS, in accordance with one or more embodiments. The example 400 does not implement a power delivery limit. The example 400 includes shading 410 representing energy sent from the RES to the grid or point of interconnect (POI) with the grid. The example 400 includes shading 420 representing energy sent to the ESS from the RES. The example 400 includes shading 430 representing energy sent from the ESS to the grid or the POI with the grid. The example 400 includes a first line 440 representing an amount of DC power the RES is capable of producing at each hour of the day. The example 400 includes a second line 450 representing the amount of AC power produced by an inverter system of the RES, or the inverter output. In the example 400, the RES is rated at 800 MW and the inverter capacity is rated at 600 MW, while a limit to how much power the grid can receive, otherwise called a point of grid interconnect (POGI) limit, is 400 MW. In the example 400, the ESS has a capacity of 1,200 MWh and a power limit of 300 MW.

In the example 400, the inverter output 450 rises to about 500 MW by hour 10, but only 400 MW is delivered to the POGI according to the POGI limit. About 100 MW is diverted from the RES to the ESS as shown by the shading 420, charging the ESS. Around hour 16, when the inverter output 450 declines, the ESS begins delivering power to the grid, as shown by shading 430. The power delivered to the grid from the ESS declines until it reaches zero around hour 19. Power is not delivered as late into the evening in the example 400 as in the example 300. This is because less energy is produced in the example 400 than in the example 300, meaning that there is less energy available to charge the ESS. The power delivery schedule of the example 400 may be problematic for a grid operator for several reasons. First, power may be needed for longer than it is provided in the example 400. During winter months, people may need more power in the evening than they need during summer months when days are longer. Second, the grid may not be able to receive power during the day at the levels contemplated by the power delivery schedule of the example 400. In winter months, electrical energy use may be lower than in summer months. Air conditioning may make up a large component of summer daytime electric loads, meaning that electric power demand is lower in the winter than in the summer. The POGI limit during the winter months may be lowered to reflect the lowered demand for power. Thus, the power delivery schedule of the example 400 may be unacceptable to a grid operator.

Figure 5:
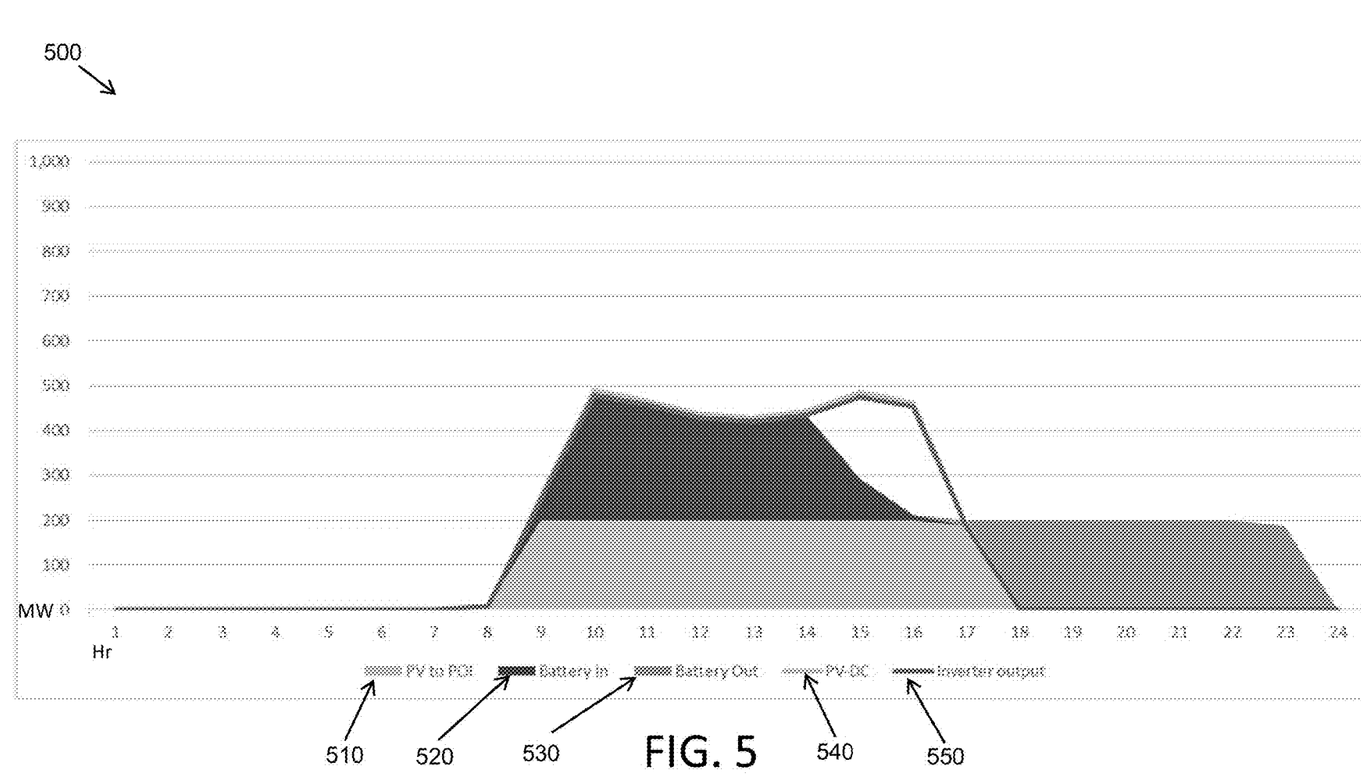
FIG. 5 illustrates an example of power generation and delivery over 24 hours in January for a power plant including an RES and an ESS and implementing a power delivery limit, in accordance with one or more embodiments.

FIG. 5 illustrates an example 500 of power generation and delivery over 24 hours in January for a power plant including an RES and an ESS and implementing a power delivery limit, in accordance with one or more embodiments. The example 500 includes shading 510 representing energy sent from the RES to the grid or point of interconnect (POI) with the grid. The example 500 includes shading 520 representing energy sent to the ESS from the RES. The example 500 includes shading 530 representing energy sent from the ESS to the grid or the POI with the grid. The example 500 includes a first line 540 representing an amount of DC power the RES is capable of producing at each hour of the day. The example 500 includes a second line 550 representing the amount of AC power produced by an inverter system of the RES, or the inverter output. In the example 500, the RES is rated at 800 MW and the inverter capacity is rated at 600 MW, while a limit to how much power the grid can receive, otherwise called a point of grid interconnect (POGI) limit, is 400 MW. In the example 500, the ESS has a capacity of 1,200 MWh and a power limit of 300 MW.

In the example 500, the power plant is implementing a power delivery limit of 200 MW. This means that power delivered to the grid at the POGI is limited to 200 MW as shown by the shading 510. The POGI limit is 400 MW as in the above examples, but the power delivery limit keeps power delivered to the grid well below that level. In some embodiments the power delivery limit may be implemented using a control system of the power plant. In other embodiments the power delivery limit may be implemented by reconfiguring elements of the power plant. Power generated by the RES in excess of the power delivery limit is directed to the ESS as shown by the shading 520. Once the ESS is fully charged, it can no longer receive power from the RES and power generated by the RES in excess of the power delivery limit is curtailed or dissipated. The shading 520 shows that power delivered from the RES to the ESS begins to decline starting around hour 14 until no power is directed to the ESS from the RES around hour 16. The ESS is fully charged around hour 16. With the ESS receiving more power during the day than it would if no power delivery limit were implemented, the ESS has a higher charge when the power generation of the RES begins to decline and power begins to be drawn from the ESS. This higher charge in the ESS means that the power plant is able to provide power from the ESS for longer than it would if the power delivery limit were not implemented and the ESS had a lower charge. Additionally, the ESS may be limited in how quickly it discharges based on the power delivery limit. In example 500, the ESS delivers 200 MW, the power delivery limit, to the grid from about hour 18 to about hour 23. The ESS is fully discharged around hour 24. The ESS does not necessarily need to be discharged continuously until it is fully discharged. It may be discharged for a time in the evening and then discharged partly or fully the next morning. In Example 500, due to the power delivery limit, the grid receives 200 MW of power from the power plant from about hour 9 to about hour 23. This is advantageous because it allows the grid operator to plan for consistent, constant power delivery that matches the power demands of the grid. Another advantage is the ability to sell power to remote regions at a low level over a period of time extending over several hours. Since transmission capacity is charged on the basis of peak power transmitted, delivering power at a low level over a period of time extending over several hours represents beneficial cost savings.

Figure 6:
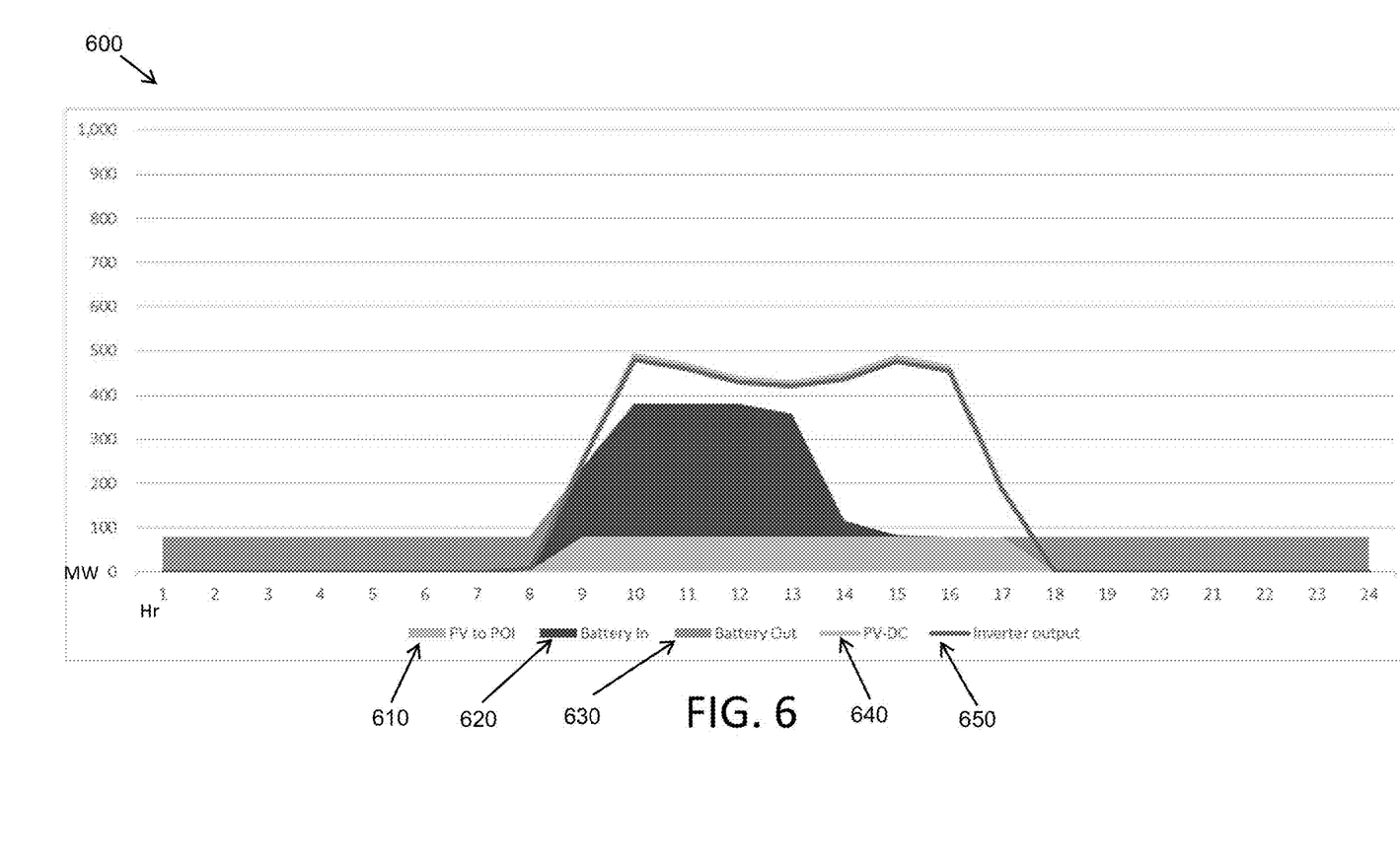
FIG. 6 illustrates another example of power generation and delivery over 24 hours in January for a power plant including an RES and an ESS and implementing a power delivery limit, in accordance with one or more embodiments.

FIG. 6 illustrates an example 600 of power generation and delivery over 24 hours in January for a power plant including an RES and an ESS and implementing a power delivery limit, in accordance with one or more embodiments. The example 600 includes shading 610 representing energy sent from the RES to the grid or point of interconnect (POI) with the grid. The example 600 includes shading 620 representing energy sent to the ESS from the RES. The example 600 includes shading 630 representing energy sent from the ESS to the grid or the POI with the grid. The example 600 includes a first line 640 representing an amount of DC power the RES is capable of producing at each hour of the day. The example 600 includes a second line 650 representing the amount of AC power produced by an inverter system of the RES, or the inverter output. In the example 600, the RES is rated at 800 MW and the inverter capacity is rated at 600 MW, while a limit to how much power the grid can receive, otherwise called a point of grid interconnect (POGI) limit, is 400 MW. In the example 600, the ESS has a capacity of 1,200 MWh and a power limit of 300 MW.

In the example 600, the power plant is implementing a power delivery limit of 80 MW. This means that power delivered to the grid at the POGI is limited to 80 MW as shown by the shading 610 and shading 630. The POGI limit is 400 MW as in the above examples, but the power delivery limit keeps power delivered to the grid well below that level. In some embodiments the power delivery limit may be implemented using a control system of the power plant. In other embodiments the power delivery limit may be implemented by reconfiguring elements of the power plant. Power generated by the RES in excess of the power delivery limit is directed to the ESS as shown by the shading 620. Once the ESS is fully charged, it can no longer receive power from the RES and power generated by the RES in excess of the power delivery limit is curtailed or dissipated. The shading 620 shows that power delivered from the RES to the ESS begins to decline starting around hour 13 until no power is directed to the ESS from the RES around hour 15. The ESS is fully charged at some time between hours 15 and 16. With the ESS receiving more power during the day than it would if no power delivery limit were implemented, the ESS has a higher charge when the power generation of the RES begins to decline and power begins to be drawn from the ESS. This higher charge in the ESS means that the power plant is able to provide power from the ESS for longer than it would if the power delivery limit were not implemented and the ESS had a lower charge. Additionally, the ESS may be limited in how quickly it discharges based on the power delivery limit. In example 600, the ESS delivers 80 MW, the power delivery limit, to the grid from about hour 18 to about hour 8. In example 600, the ESS is never fully discharged. The ESS is able to deliver power all night long due to the higher charge of the ESS and the low power delivery limit. This is advantageous because it allows the grid operator to plan for consistent, constant power delivery that matches the power demands of the grid. In this example, the grid operator can treat the power plant as baseline power since it is providing a constant level of power. Another advantage is the ability to sell power to remote regions at a low level over a period of time extending over several hours. Since transmission capacity is charged on the basis of peak power transmitted, delivering power at a low level over a period of time extending over several hours represents beneficial cost savings.

Figure 7:
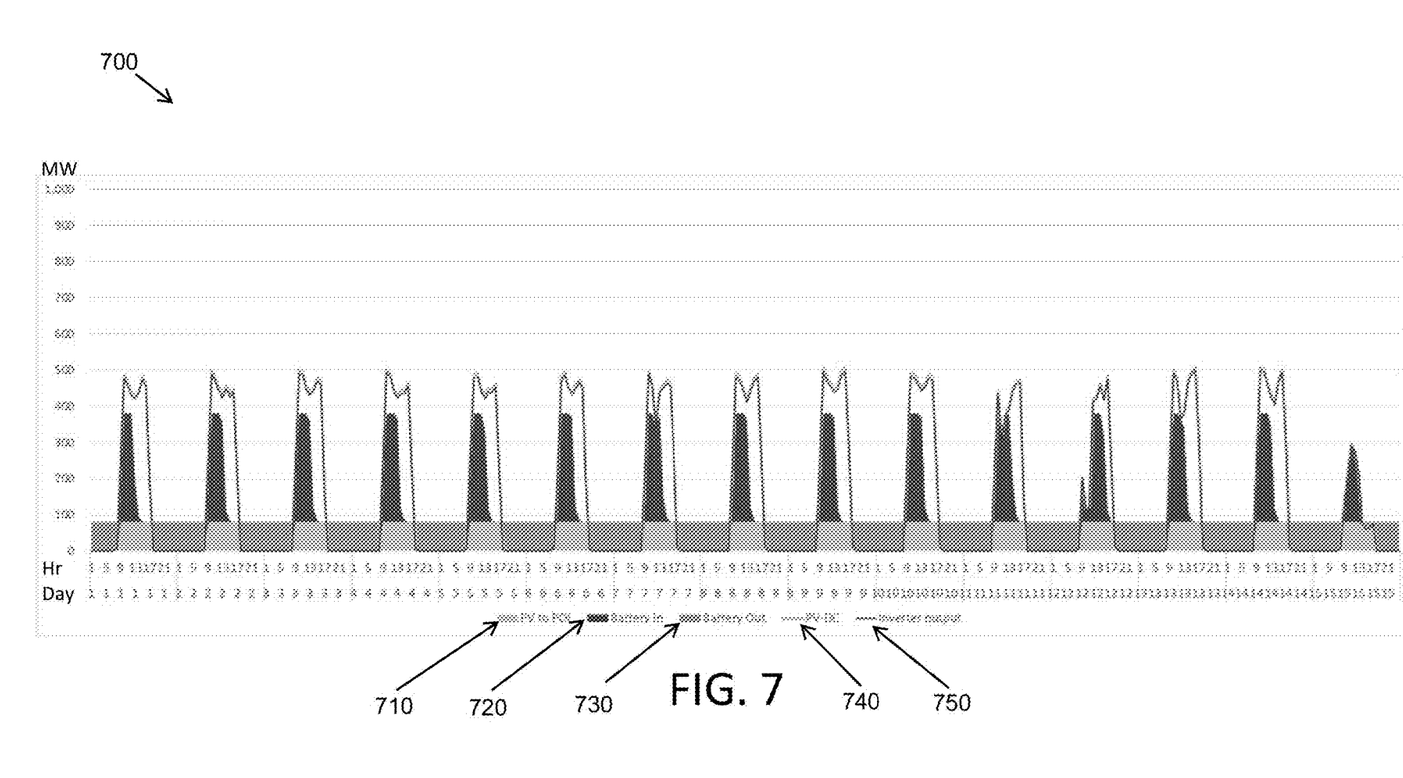
FIG. 7 illustrates an example of power generation and delivery over 15 days in January for a power plant including an RES and an ESS and implementing a power delivery limit, in accordance with one or more embodiments.

FIG. 7 illustrates an example 700 of power generation and delivery over the first 15 days in January for a power plant including an RES and an ESS and implementing a power delivery limit, in accordance with one or more embodiments. The example 700 includes shading 710 representing energy sent from the RES to the grid or point of interconnect (POI) with the grid. The example 700 includes shading 720 representing energy sent to the ESS from the RES. The example 700 includes shading 730 representing energy sent from the ESS to the grid or the POI with the grid. The example 700 includes a first line 740 representing an amount of DC power the RES is capable of producing at each hour of the day. The example 700 includes a second line 750 representing the amount of AC power produced by an inverter system of the RES, or the inverter output. In the example 700, the RES is rated at 800 MW and the inverter capacity is rated at 600 MW, while a limit to how much power the grid can receive, otherwise called a point of grid interconnect (POGI) limit, is 400 MW. In the example 700, the ESS has a capacity of 1,200 MWh and a power limit of 300 MW.

Example 700 is similar to example 600 in that a power delivery limit of 80 MW is implemented by the power plant. Example 700, like example 600, shows how continuous power delivery is possible by implementing the power delivery limit. Example 700 also shows how continuous power delivery is possible even when power generation by the RES is limited. Power generation by an RES may be limited by a number of factors. For example, a solar array may produce less power than expected if unexpected weather events limit an amount of irradiance on the solar array. In example 700, power generated by the RES, or inverter output, as shown by line 750, is reduced on day 11, day 12, and day 15, as compared to the other days. However, due to the power delivery limit, the ESS still has enough charge to deliver power during the night. On days 11 and 12, the ESS was able to be fully charged during the day despite the reduced power generation by the RES. On day 15, the ESS was not able to be fully charged during the day due to the reduced power generation by the RES. In example 700, the power delivery limit was set low enough that, after a day of average power generation by the RES, there is still energy left in the ESS after the ESS has delivered power all night. This power is usually unused, but on days when RES is lower than usual, this unused power can be used to ensure power delivery during the night. Thus, despite the reduced power generation by the RES on day 11, day 12, and day 15, the ESS is able to provide power all night long. This is advantageous because it reduces a variability of power delivery from the power plant to the grid. This is advantageous because it allows the grid operator to treat the power plant as base power since it provides a constant level of power. Another advantage is the ability to sell power to remote regions at a low level over a period of time extending over several hours. Since transmission capacity is charged on the basis of peak power transmitted, delivering power at a low level over a period of time extending over several hours represents beneficial cost savings.

Figure 8:
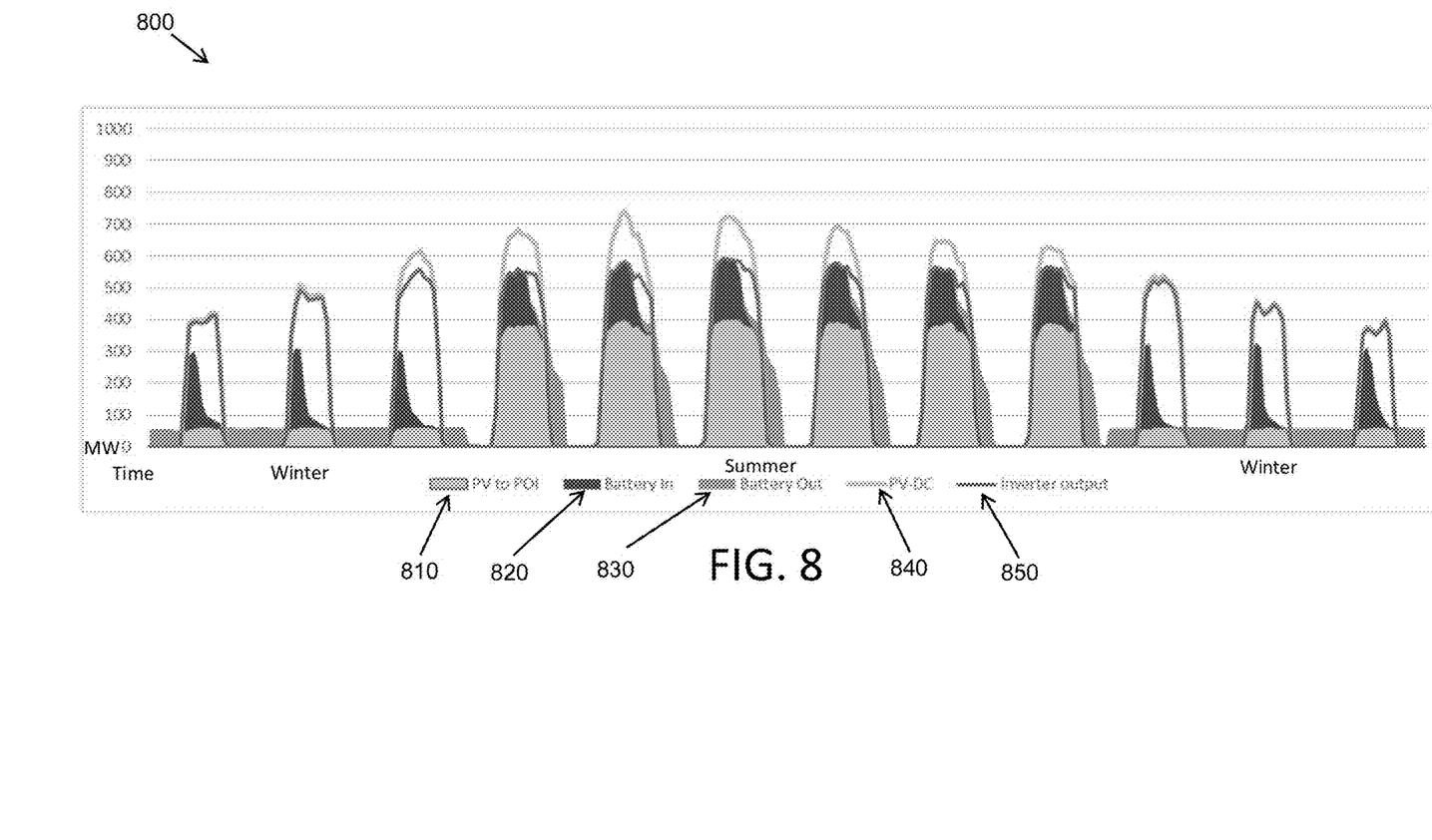
FIG. 8 illustrates an example of power generation and delivery over 1 year for a power plant including an RES and an ESS and implementing a power delivery limit in winter months, in accordance with one or more embodiments.

FIG. 8 illustrates an example 800 of power generation and delivery over an entire year for a power plant including an RES and an ESS and implementing a power delivery limit, in accordance with one or more embodiments. The example 800 represents the power generation and delivery for each month by showing the power generation and delivery of the power plant of an average day of the month. In some embodiments the power generation and delivery of the average day of the month may be an average of the power generation and delivery of all the days in the month. In other embodiments, the power generation and delivery of the average day of the month may be a power generation and delivery of a representative day of the month. In example 800, the power generation and delivery of the average day of the month is a power generation and delivery of a representative day of the month. The example 800 includes shading 810 representing energy sent from the RES to the grid or point of interconnect (POI) with the grid. The example 800 includes shading 820 representing energy sent to the ESS from the RES. The example 800 includes shading 830 representing energy sent from the ESS to the grid or the POI with the grid. The example 800 includes a first line 840 representing an amount of DC power the RES is capable of producing at each hour of the day. The example 800 includes a second line 850 representing the amount of AC power produced by an inverter system of the RES, or the inverter output. In the example 800, the RES is rated at 800 MW and the inverter capacity is rated at 600 MW, while a limit to how much power the grid can receive, otherwise called a point of grid interconnect (POGI) limit, is 400 MW. In the example 800, the ESS has a capacity of 1,200 MWh and a power limit of 300 MW.

In the example 800, a power delivery limit of 80 MW is implemented during the winter months and is not implemented during the spring and summer months. This allows for constant delivery of 80 MW during the winter months, similar to example 700, and delivery of higher amounts of power up to the POGI limit of 400 MW during the spring and summer months, similar to example 300. The implementation of the power delivery limit only in the winter months may be in accordance with the needs of the grid. In the winter months, the grid may have a lower power delivery requirement and a longer delivery length requirement while in the spring and summer months the grid may have a higher power delivery requirement and a short delivery length requirement. Changing when the power delivery limit is implemented is advantageous because it allows for the power plant to meet the needs of the grid in spring and summer months and in winter months. A lower, constant, amount of power can be provided in the winter and a higher amount of power can be provided during the day in the spring and summer.

Figure 9:
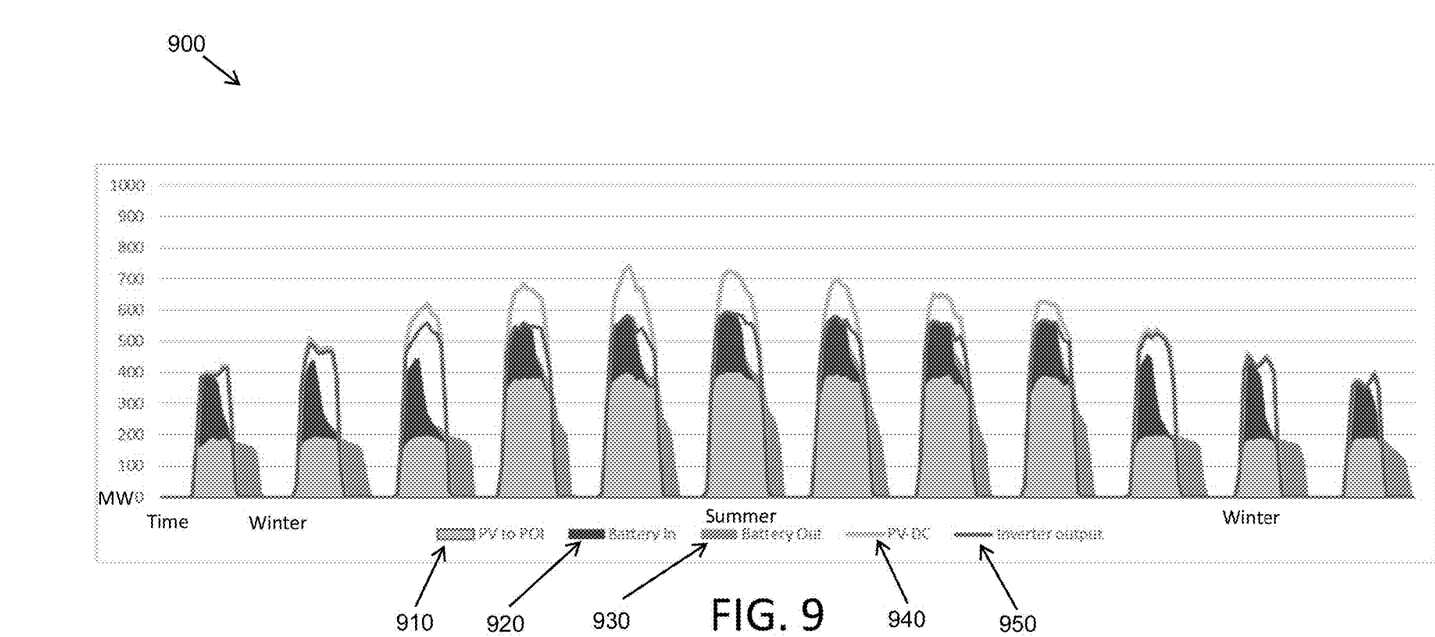
FIG. 9 illustrates another example of power generation and delivery over 1 year for a power plant including an RES and an ESS and implementing a power delivery limit in winter months, in accordance with one or more embodiments.

FIG. 9 illustrates another example 900 of power generation and delivery over an entire year for a power plant including an RES and an ESS and implementing a power delivery limit, in accordance with one or more embodiments. The example 900 represents the power generation and delivery for each month by showing the power generation and delivery of the power plant of an average day of the month. In some embodiments the power generation and delivery of the average day of the month may be an average of the power generation and delivery of all the days in the month. In other embodiments, the power generation and delivery of the average day of the month may be a power generation and delivery of a representative day of the month. In example 900, the power generation and delivery of the average day of the month is a power generation and delivery of a representative day of the month. The example 900 includes shading 910 representing energy sent from the RES to the grid or point of interconnect (POI) with the grid. The example 900 includes shading 920 representing energy sent to the ESS from the RES. The example 900 includes shading 930 representing energy sent from the ESS to the grid or the POI with the grid. The example 900 includes a first line 940 representing an amount of DC power the RES is capable of producing at each hour of the day. The example 900 includes a second line 950 representing the amount of AC power produced by an inverter system of the RES, or the inverter output. In the example 900, the RES is rated at 800 MW and the inverter capacity is rated at 600 MW, while a limit to how much power the grid can receive, otherwise called a point of grid interconnect (POGI) limit, is 400 MW. In the example 900, the ESS has a capacity of 1,200 MWh and a power limit of 300 MW.

In the example 900, a power delivery limit of 200 MW is implemented during the winter months and is not implemented during the spring and summer months. This allows for longer delivery of 200 MW during the winter months, similar to example 500, and shorter delivery of higher amounts of power up to the POGI limit of 400 MW during the spring and summer months, similar to example 300. The implementation of the power delivery limit only in the winter months may be in accordance with the needs of the grid. The implementation of the power delivery limit of 200 MW may be in accordance with the needs of the grid if greater power delivery until midnight is preferable to lower power delivery all night long. In the winter months, the grid may have a lower power delivery requirement and a longer delivery length requirement while in the spring and summer months the grid may have a higher power delivery requirement and a short delivery length requirement. Changing when the power delivery limit is implemented is advantageous because it allows for the power plant to meet the needs of the grid in spring and summer months and in winter months. A lower amount of power can be provided in the winter for a longer period of time and a higher amount of power can be provided during the day for a shorter period of time in the spring and summer.

Figure 10:
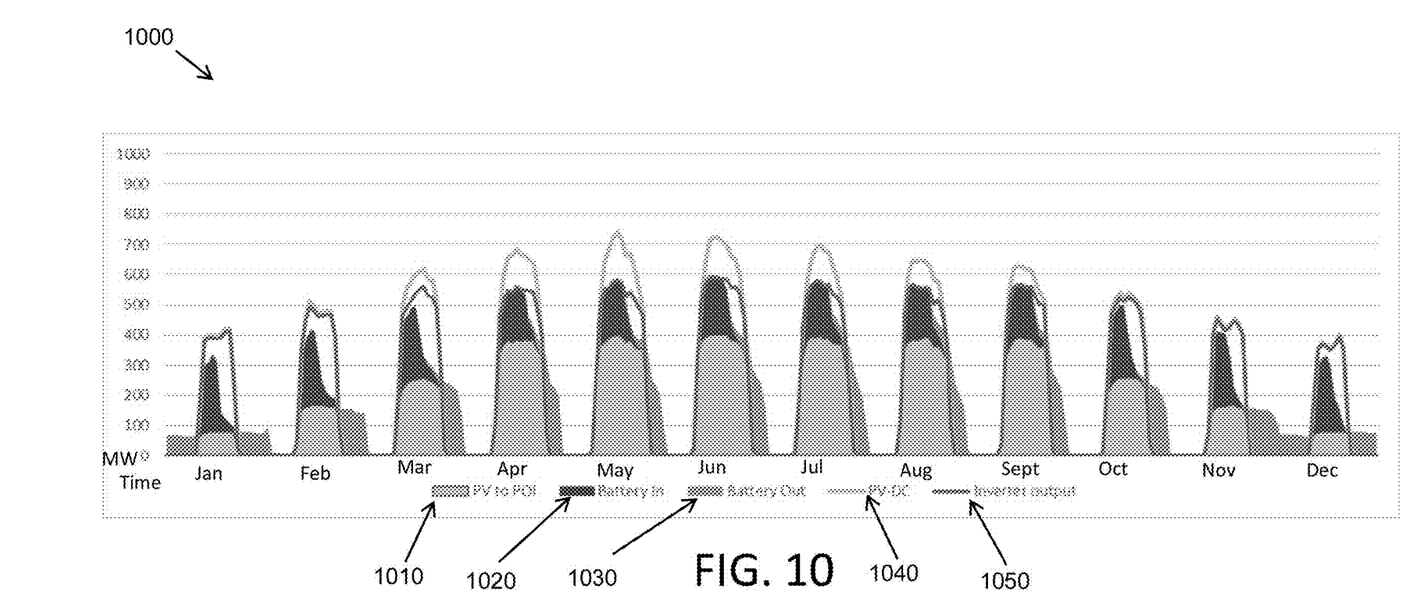
FIG. 10 illustrates an example of power generation and delivery over 1 year for a power plant including an RES and an ESS and implementing a varying power delivery limit, in accordance with one or more embodiments.

FIG. 10 illustrates another example 1000 of power generation and delivery over an entire year for a power plant including an RES and an ESS and implementing a power delivery limit, in accordance with one or more embodiments. The example 1000 represents the power generation and delivery for each month by showing the power generation and delivery of the power plant of an average day of the month. In some embodiments the power generation and delivery of the average day of the month may be an average of the power generation and delivery of all the days in the month. In other embodiments, the power generation and delivery of the average day of the month may be a power generation and delivery of a representative day of the month. In example 1000, the power generation and delivery of the average day of the month is a power generation and delivery of a representative day of the month. The example 1000 includes shading 1010 representing energy sent from the RES to the grid or point of interconnect (POI) with the grid. The example 1000 includes shading 1020 representing energy sent to the ESS from the RES. The example 1000 includes shading 1030 representing energy sent from the ESS to the grid or the POI with the grid. The example 1000 includes a first line 1040 representing an amount of DC power the RES is capable of producing at each hour of the day. The example 1000 includes a second line 1050 representing the amount of AC power produced by an inverter system of the RES, or the inverter output. In the example 1000, the RES is rated at 800 MW and the inverter capacity is rated at 600 MW, while a limit to how much power the grid can receive, otherwise called a point of grid interconnect (POGI) limit, is 400 MW. In the example 1000, the ESS has a capacity of 1,200 MWh and a power limit of 300 MW.

The example 1000 is similar to the example 900 except that instead of implementing a power delivery limit of 200 MW in the winter months and not power delivery limit during the summer months, the power plant of the example 900 implements a power delivery limit of 80 MW in January and December, a power delivery limit of 170 MW in February and November, a power delivery limit of 260 MW in March and October, and a power delivery limit of 400

MW, equal to the POGI limit, in April through September. The example 1000 shows an example of how the power delivery limit may be implemented for different periods of time and varied over time. The power delivery limit may vary over shorter or longer periods of time and may be implemented for longer or shorter periods of time.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving a prediction of power generation for a renewable energy source (RES);
   receiving length of power delivery requirements of a grid, wherein the length of power delivery requirements of the grid specifies an amount of time greater than a length of time of power generation of the RES;
   determining a stretch mode limit based on the prediction of power generation and the length of power delivery requirements such that a period of time during which the RES and an energy storage system (ESS) can deliver power to the grid is extended to satisfy the length of power delivery requirements, wherein the stretch mode limit comprises a limit on power delivered to the grid, and wherein the stretch mode limit is below a point of grid interconnect (POGI) limit; and delivering power to the grid according to the stretch mode limit from the RES and an energy storage system (ESS) electrically coupled to the RES, wherein the combined output of the RES and the ESS is limited by the stretch mode limit.

2. The method of claim 1, wherein the stretch mode limit is determined low enough such that the RES and ESS can satisfy the length of power delivery requirements despite fluctuations in an RES power output.

3. The method of claim 1, further comprising implementing the stretch mode limit at a first time and not implementing the stretch mode limit at a second time, wherein implementing the stretch mode limit comprises delivering power to the grid according to the stretch mode limit.

4. The method of claim 3, wherein the stretch mode limit is implemented on a regular cycle.

5. The method of claim 4, wherein the stretch mode limit is implemented in winter and not implemented in summer.

6. The method of claim 3, further comprising implementing a second stretch mode limit at the second time.

7. The method of claim 6, wherein the second stretch mode limit is higher than the stretch mode limit.

8. A system comprising:
a controller configured to:
receive a prediction of power generation for a renewable energy source (RES);
receive length of power delivery requirements of a grid, wherein the length of power delivery requirements of the grid specifies an amount of time greater than a length of time of power generation of the RES;
determine a stretch mode limit based on the prediction of power generation and the length of power delivery requirements such that a period of time during which the RES and an emery storage system (ESS) can deliver power to the grid is extended to satisfy the length of power delivery requirements, wherein the stretch mode limit comprises a limit on power delivered to the grid, and wherein the stretch mode limit is below a point of grid interconnect (POGI) limit; and
deliver power to the grid according to the stretch mode limit from the RES and an energy storage system (ESS) electrically coupled to the RES, wherein the combined output of the RES and the ESS is limited by the stretch mode limit.

9. The system of claim 8, wherein the controller is further configured to determine the stretch mode limit low enough such that the RES and ESS can satisfy the length of power delivery requirements despite fluctuations in an RES power output.

10. The system of claim 8, wherein the controller is further configured to implement the stretch mode limit at a first time and not implement the stretch mode limit at a second time, wherein implementing the stretch mode limit comprises delivering power to the grid according to the stretch mode limit.

11. The system of claim 10, wherein the controller is further configured to implement the stretch mode limit on a regular cycle.

12. The system of claim 11, wherein the controller is configured to implement the stretch mode limit in winter and not in summer.

13. The system of claim 10, wherein the controller is further configured to implement a second stretch mode limit at the second time.

14. The system of claim 13, wherein the second stretch mode limit is higher than the stretch mode limit.

15. A non-transitory, computer-readable medium comprising instructions, which, when executed by a processor, cause the processor to:
receive a prediction of power generation for a renewable energy source (RES);
receive length of power delivery requirements of a grid, wherein the length of power delivery requirements of the grid specifies an amount of time greater than a length of time of power generation of the RES;
determine a stretch mode limit based on the prediction of power generation and the length of power delivery requirements such that a period of time during which the RES and an energy storage system (ESS) can deliver power to the grid is extended to satisfy the length of power delivery requirements, wherein the stretch mode limit comprises a limit on power delivered to the grid, and wherein the stretch mode limit is below a point of grid interconnect (POGI) limit; and
deliver power to the grid according to the stretch mode limit from the RES and an energy storage system (ESS) electrically coupled to the RES, wherein the combined output of the RES and the ESS is limited by the stretch mode limit.

16. The medium of claim 15, wherein the instructions further cause the processor to determine the stretch mode limit low enough such that the RES and ESS can satisfy the length of power delivery requirements despite fluctuations in an RES power output.

17. The medium of claim 15, wherein the instructions further cause the processor to implement the stretch mode limit at a first time and not implement the stretch mode limit at a second time, wherein implementing the stretch mode limit comprises delivering power to the grid according to the stretch mode limit.

18. The medium of claim 17, wherein the instructions further cause the processor to implement the stretch mode limit on a regular cycle.

19. The medium of claim 18, wherein the instructions further cause the processor to implement the stretch mode limit in winter and not in summer.

20. The medium of claim 17, wherein the instructions further cause the processor to implement a second stretch mode limit at the second time.

21. The medium of claim 20, wherein the second stretch mode limit is higher than the stretch mode limit.

* * * * *